United States Patent
Konno et al.

(10) Patent No.: US 6,806,587 B2
(45) Date of Patent: Oct. 19, 2004

(54) REMOTE LOCK OPERATION APPARATUS FOR LIGHT VEHICLE

(75) Inventors: Takeshi Konno, Saitama (JP); Masayoshi Orita, Saitama (JP); Kenji Tamaki, Saitama (JP); Shinji Furuta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/076,649

(22) Filed: Feb. 19, 2002

(65) Prior Publication Data

US 2002/0121808 A1 Sep. 5, 2002

(30) Foreign Application Priority Data

Feb. 19, 2001 (JP) ........................................ 2001-042272
Feb. 19, 2001 (JP) ........................................ 2001-042274
Feb. 19, 2001 (JP) ........................................ 2001-042276

(51) Int. Cl.[7] ............................. B60L 3/00; B62H 5/00
(52) U.S. Cl. ....................................... 307/9.1; 180/287
(58) Field of Search ................................. 307/9.1–10.6; 340/825.69, 825.72, 825.3–825.34; 180/286, 287; 70/252, 256

(56) References Cited

U.S. PATENT DOCUMENTS 5,124,565 A * 6/1992 Yoshida et al. ............ 340/5.61
5,343,077 A    8/1994 Yoshida et al.
5,886,349 A    3/1999 Su
2001/0012709 A1 * 8/2001 Nakao et al. .............. 439/76.2
2002/0113490 A1 * 8/2002 Konno ....................... 307/9.1
2002/0121971 A1 * 9/2002 Konno ....................... 340/426
2003/0024754 A1 * 2/2003 Konno et al. ............... 180/287

FOREIGN PATENT DOCUMENTS

| EP | 0 774 405 A2 | 5/1997 | |
| EP | 0 953 500 A2 | 4/1999 | |
| FR | 2 754 226 A1 | 10/1997 | |
| JP | 03295777 A * | 12/1991 | ............ B62H/5/20 |

* cited by examiner

Primary Examiner—Gregory J. Toatley, Jr.
(74) Attorney, Agent, or Firm—Birch, Stewart, Kolasch & Birch, LLP

(57) ABSTRACT

This invention relates to a remote lock operation apparatus for a light vehicle without a cabin and having two, three, or four wheels. One objective of the invention is to make it possible for the infrared receiver of a remote lock operation apparatus to cover a range of directivity without being influenced by a seat or a vehicle body rear portion. Another objective is limit the design of the remote lock apparatus to as few as one infrared receiver, thereby reducing the burden to a vehicle battery. In this invention, an infrared receiver is disposed at the center of a vehicle body front half portion in a vehicle widthwise direction with a reception face thereof directed rearwardly. Further, the receiver is placed at a height at which reception of an infrared signal emitted from rearwardly is not disturbed by a vehicle accessory or a vehicle body rear portion on the rear side with respect to the receiver.

9 Claims, 10 Drawing Sheets

REMOTE LOCK OPERATION APPARATUS FOR LIGHT VEHICLE

CROSS-REFERENCE TO RELATED APPLICATIONS

The present application claims priority under 35 U.S.C. §119 to Japanese Patent Application Nos. 2001-042272, 2001-042274, and 2001-042276, filed on Feb. 19, 2001, the entire contents thereof are hereby incorporated by reference.

BACKGROUND OF THE INVENTION

1. Field of the Invention

This invention relates to a remote lock operation apparatus for a light vehicle having no cabin. It is to be noted that the "light vehicle having no cabin" in the present invention may be any of a two-wheel car, a three-wheel car and a four-wheel car of the saddle-ride type and the seated type, and may include or not include a prime mover. For example, a motorcycle, a scooter, a bicycle and so forth are included in the two-wheel car.

2. Description of Background Art

In a conventional motorcycle, scooter or the like, various locking mechanisms for preventing theft or mischief such as, for example, a main stand locking apparatus, a steering handle locking apparatus, a seat locking apparatus and so forth are provided at suitable locations of a vehicle body. Those locking mechanisms can be locked and unlocked arbitrarily by a driver operating a locking operation section provided on the vehicle body side through a key operation.

Meanwhile, in four-wheel cars in recent years, an apparatus wherein a door locking mechanism can be locked and unlocked without a key by means of a remote lock operation apparatus which uses an infrared signal. In the conventional apparatus of the type mentioned, in order to assure a wide angle of directivity for an infrared signal, several infrared receivers are disposed discretely at suitable locations of a vehicle.

Thus, it is a possible idea to make it possible to lock and unlock the locking mechanism for a light vehicle such as a motorcycle having no cabin without a key by means of a remote lock operation apparatus which uses an infrared signal.

In this instance, since the light vehicle is different from a four-wheel automobile in that the capacity of a battery incorporated therein is considerably small, if several infrared receivers are used simultaneously as in a four-wheel automobile, then the total standby current is excessively high when compared with the battery capacity. This may possibly give rise to frequent occurrences of consumption of the battery, resulting in failure in starting of the engine, damage to the durability of the battery and so forth.

Additionally, the light vehicle is different from a four-wheel automobile in that it does not have a strong cabin which is surrounded by a roof, a side door and so forth, and an entire appearance of the vehicle body including a handle part and members around the handle part is exposed widely to the outside. Accordingly, when it is intended to provide an infrared receiver on an outer face of such a vehicle body as just described, it is desired to prevent the infrared receiver from being damaged simply through a collision or contact with some other element.

Meanwhile, the directivity required for an infrared receiver for the light vehicle generally is within the range of 45 degrees on the left and the right with respect to a longitudinal center line of the vehicle body as viewed rearwardly from the position of the left and right handle grips of the vehicle in the forward and backward direction of the vehicle body as seen in FIG. 1. Accordingly, the mounted position of the infrared receiver is preferably set to such a position at which the receiver can cover at least the directivity range without being influenced by the seat or a vehicle body rear portion.

Further, if the infrared receiver is exposed to the direct rays of the sun in the daytime, then a noise signal from the rays of the sun is mixed into a reception signal by the receiver, and there is the possibility that the signal to noise ratio (SN ratio) of the receiver may be deteriorated and the communication reliability with an infrared transmitter may be deteriorated as much. Accordingly, upon installation of the infrared receiver, it is desired to prevent the infrared receiver from being less likely to be exposed to the direct rays of the sun in the daytime.

SUMMARY AND OBJECTS OF THE INVENTION

The present invention has been proposed taking the foregoing into consideration, and it is an object of the present invention to provide a remote lock operation apparatus for a light vehicle which satisfies the requirement described above and is simple in structure.

In order to attain the object described above, according to the present invention, a remote lock operation apparatus for a light vehicle having no cabin includes a portable infrared transmitter, an infrared receiver capable of receiving an infrared signal emitted from the infrared transmitter, a lock actuator capable of locking and unlocking a lock mechanism incorporated in a vehicle body, and a control apparatus for controlling operation of the lock actuator based on the infrared signal received by the infrared receiver. Further, the infrared receiver is disposed at the center of a vehicle body front half portion in a vehicle widthwise direction with a reception face thereof directed rearwardly and is placed at a height at which reception of an infrared signal emitted from rearwardly is not disturbed by a vehicle accessory or a vehicle body rear portion on the rear side with respect to the receiver.

According to the present invention as described above, since the layout of the infrared receiver is such as described above, the range of directivity of the infrared receiver required for a light vehicle of the type described can be covered readily without being influenced by the seat or the vehicle body rear portion. Accordingly, the necessary directivity can be assured even with the only one infrared receiver, and the number of infrared receivers to be used can be reduced to the utmost. Therefore, the standby current of the infrared receiver can be reduced to a level with which consumption of a battery does not occur even if the capacity of the battery is small. Consequently, failure in starting of an engine by consumption of the battery can be prevented, and also, the durability of the battery is raised.

Further, the present invention is directed to a remote lock operation apparatus for a light vehicle having a bar handle connected to an upper end portion of a steering shaft for steering a front wheel, and an inner cover fixed to a vehicle body front portion for covering the rear side of the steering shaft below the bar handle having no cabin. The invention includes a portable infrared transmitter, an infrared receiver capable of receiving an infrared signal emitted from the infrared transmitter, a lock actuator capable of locking and unlocking a lock mechanism incorporated in a vehicle body, and a control apparatus for controlling operation of the lock actuator based on the infrared signal received by the infrared receiver, wherein the infrared receiver is disposed on a rear face of the inner cover.

Thus, even though the light vehicle does not have a strong cabin, since the infrared receiver is provided on the rear face of the inner cover, the infrared receiver is less likely to be damaged through a collision or contact with other elements. Further, the receiver can be protected effectively from falling down and so forth and the reliability in traveling is raised. Also, since the inner cover is positioned below the bar handle (particularly, in a light vehicle of the type wherein a handle is covered with a handle cover, the handle cover), the infrared receiver provided on the inner cover is less likely to be exposed to the direct rays of the sun in the daytime. Consequently, deterioration of the SN ratio of the receiver is suppressed effectively, and the communication reliability between the transmission and receivers is raised. Further, since an upper portion of the inner cover is provided at a comparatively high position spaced forwardly away from a seat and a vehicle body rear portion, where the infrared receiver is disposed at the upper portion of the inner cover, the range of directivity of the infrared receiver required for the light vehicle can be covered readily without being influenced by the seat or the vehicle body rear portion to the utmost.

Further, the present invention also includes a remote lock operation apparatus for a light vehicle, wherein a concave face hollow to the front side of the vehicle body or an inclined face inclined rearwardly downwards is formed on the rear face of the inner cover, and the infrared receiver is provided on the concave face or the inclined face. The infrared receiver is further less likely to be damaged through a collision or contact with some other element and can be protected more effectively from falling down. In addition, the infrared receiver is further less likely to be exposed to the direct rays of the sun in the daytime and the communication reliability is further raised.

In order to attain the object described above, the present invention is directed to a remote lock operation apparatus for a light vehicle without a cabin and having a bar handle for steering a front wheel and a handle cover for covering a central portion of the bar handle are disposed on the front side and on the upper side with respect to a seat. The invention includes a portable infrared transmitter, an infrared receiver capable of receiving an infrared signal emitted from the infrared transmitter, a lock actuator capable of locking and unlocking a lock mechanism incorporated in a vehicle body, and a control apparatus for controlling operation of the lock actuator based on the infrared signal received by the infrared receiver, wherein the infrared receiver is disposed on a rear portion outer face of the handle cover which is inclined rearwardly downwards.

Thus, although the light vehicle does not have a strong cabin, since the infrared receiver is provided on the rear portion outer face of the handle cover, the infrared receiver is less likely to be damaged through a collision or contact with other elements. Further, it can be protected effectively from falling down, and the reliability in traveling can be raised. In addition, since the infrared receiver is provided on the rearwardly inclined rear portion outer face of the handle cover, it is less likely to be exposed to the direct rays of the sun in the daytime. Consequently, deterioration of the SN ratio of the receiver is suppressed effectively, and the communication reliability between the transmitter and receiver is raised. Further, since the handle cover is usually provided at a higher position than the seat or the vehicle body rear portion, through the fact that the infrared receiver is disposed on the rear portion outer face of such a handle cover as just described, the range of directivity of the infrared receiver required for the light vehicle can be covered readily without being influenced by the seat or the vehicle body rear portion to the utmost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First, in the first embodiment shown in FIGS. 1 to 4, a scooter V as a light vehicle having no cabin includes a step ST provided between front and rear wheels Wf and Wr for receiving the feet of the driver placed thereon. A seat S on which the driver should be seated is disposed at an upper portion of a rear body cover Fr made of metal or synthetic resin as a vehicle body rear portion which is erected uprightly from a rear end of the step ST. A baggage accommodating seat box (not shown) is disposed in the rear body cover Fr, and the seat S is mounted on the seat box or the like such that the seat S can be opened and closed between a closing position at which the seat S covers an open end of the seat box and an opening position.

Further, the scooter V includes a bar handle H operable for steering the front wheel Wf through a steering shaft 11. The steering shaft 11 is supported for rotation on a head pipe of a vehicle body front frame not shown and extends in an upward and downward, rearwardly inclined posture on the inner side, that is, on the rear side, of a front body cover Ff made of metal or synthetic resin as the vehicle body front portion. A lower portion of the steering shaft 11 is formed in a bifurcated fork for supporting the front wheel Wf for rotation. An upper end of the steering shaft 11 is coupled to a central portion of the bar handle H such that the bar handle H and the steering shaft 11 are turned integrally in accordance with a steering operation.

The central portion of the bar handle H and the upper end portion of the steering shaft 11 are covered in good appearance with a T-shaped handle cover Hc made of synthetic resin or metal which is turned integrally with them. Left and right handle grips Hg at the opposite ends of the bar handle H extend outwardly from the opposite left and right end portions of the handle cover Hc.

Figure 3:
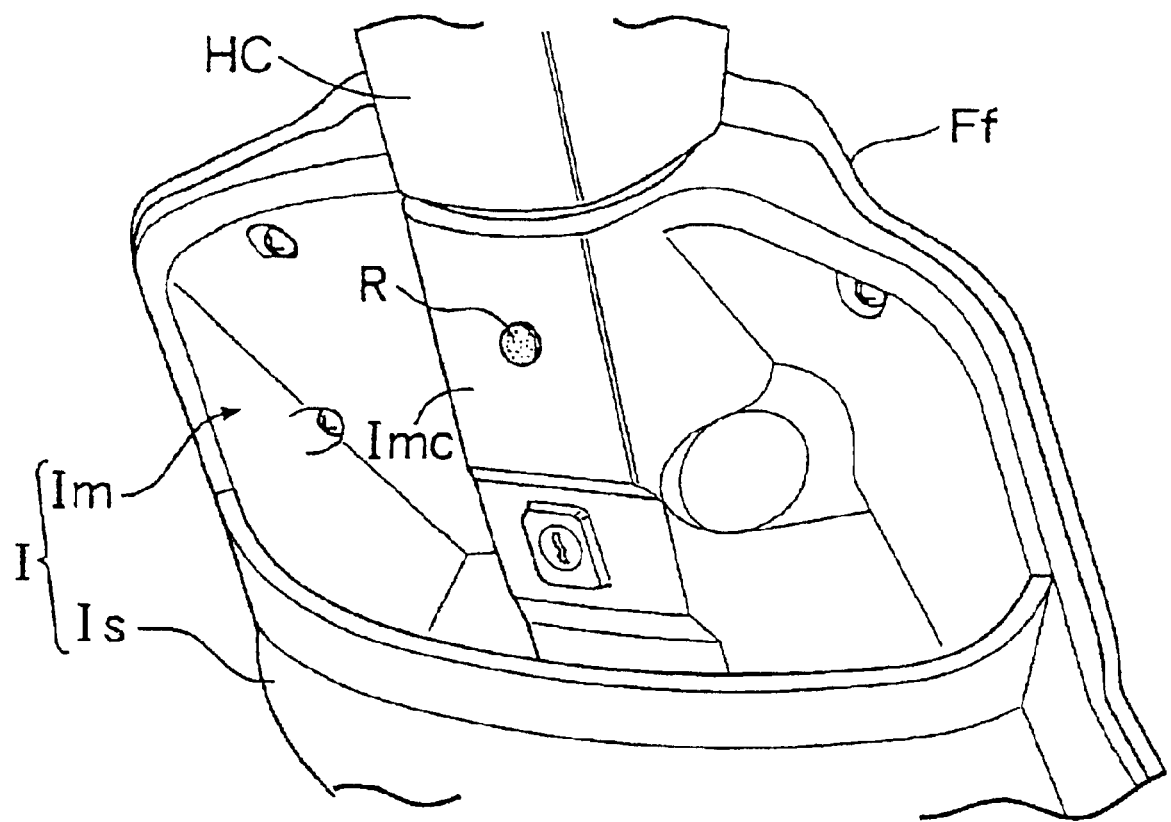
FIG. 3 is a perspective view of the scooter of the first embodiment (an enlarged view as viewed in the direction indicated by an arrow mark 3 in FIG. 2) of an inner cover as viewed from obliquely rearwardly.
Figure 4:
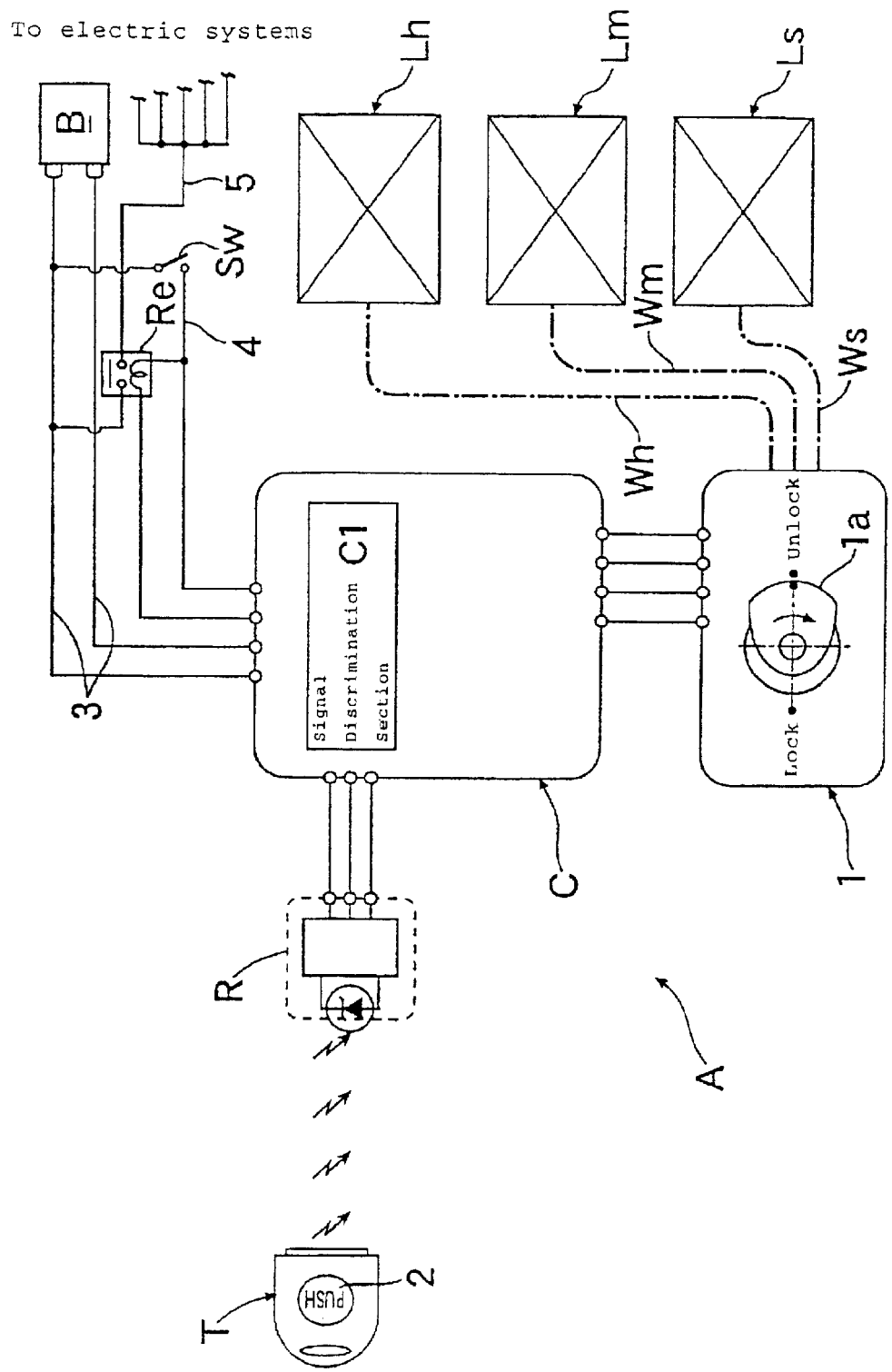
FIG. 4 is a schematic block diagram of a remote lock operation apparatus of the scooter of the first, third, fourth, and fifth embodiments.

As shown in FIG. 3, the rear side of a lower side portion of the steering shaft 11 just under the handle cover Hc is covered with an inner cover I. Inner cover I is a portion of the vehicle body front portion, is made of metal or synthetic resin, and is erected uprightly and integrally from a front end portion of the step ST. The inner cover I is removably coupled to the rear face side of the front body cover Ff, and a vehicle body space through which the steering shaft 11 extends is formed between the rear face side of the cover Ff and the inner cover I.

Figure 2:
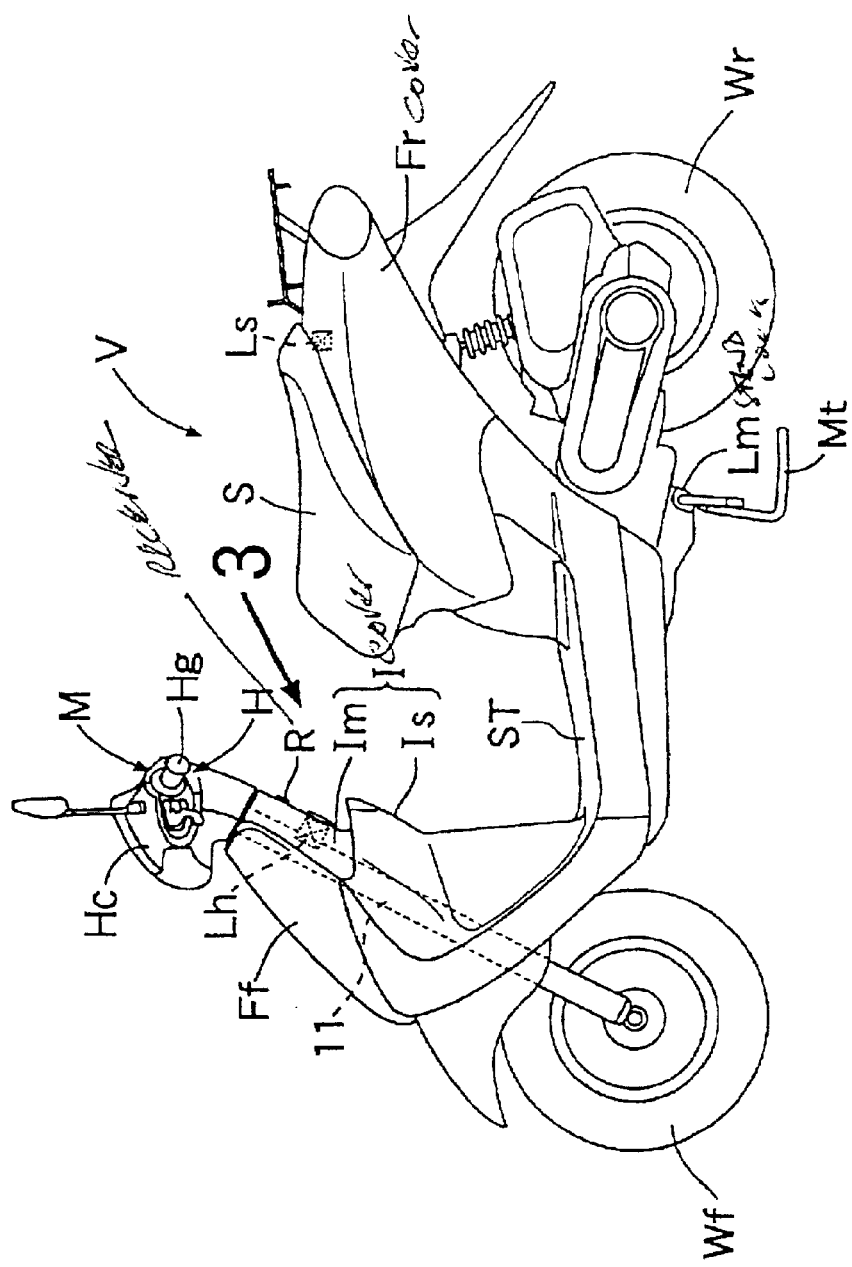
FIG. 2 is a side elevational view of the scooter of the first, third, and fourth embodiments.

The inner cover I is formed from an inner cover body Im and an auxiliary cover Is which covers a lower portion of a rear face of the inner cover body Im, and an upper portion of the rear face of the cover body Im is open rearwardly. A central portion of the inner cover body Im is swollen to the rear side such that it surrounds a rear half portion of the steering shaft 11, and a rear face of the central swollen portion Imc is inclined rearwardly downwards such that it extends substantially along the steering shaft 11. As can be seen in FIGS. 2 and 3, an infrared receiver R which is hereinafter described is disposed at a central position of the inclined face in a vehicle widthwise direction.

Further, as shown in FIG. 2, a handle lock mechanism Lh for controlling pivotal motion of the handle H upon parking, a stand lock mechanism Lm for locking a main stand Mt, which can be pivoted between an upright position and a horizontal accommodated position, at the upright position and a seat lock mechanism Ls for locking the seat S at the closing position, at which the seat S covers the open upper end of the seat box described above are provided at suitable locations of the vehicle body of the scooter V. Since the structure of the lock mechanisms Lh, Lm and Ls are conventionally known, description of the detailed structure of them is omitted.

Figure 1:
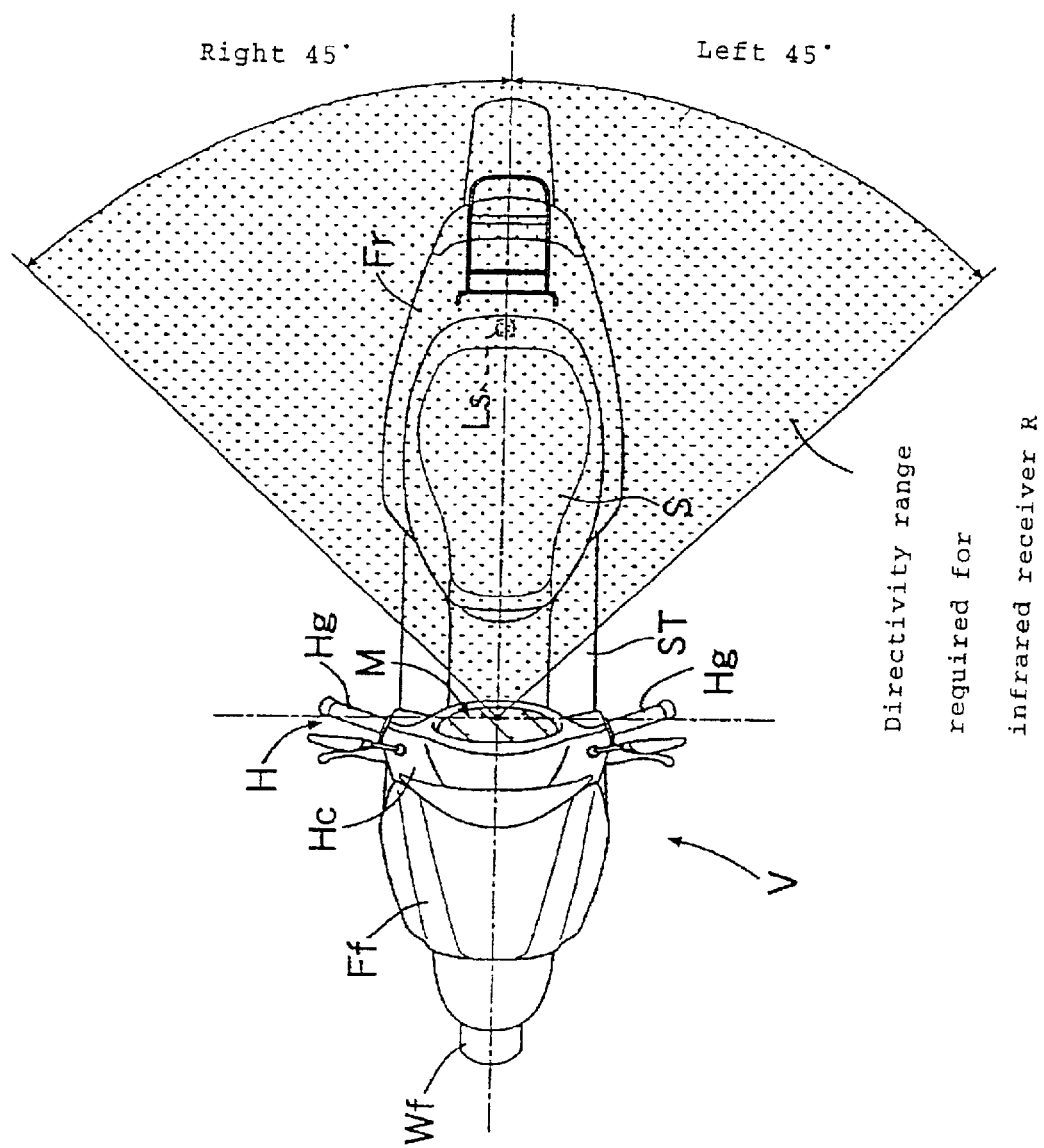
FIG. 1 is a plan view of the scooter of the first embodiment of the present invention.

Referring to FIG. 1, operation wires Wh, Wm and Ws extend from the lock mechanisms Lh, Lm and Ls, respectively, and a single common electrically driven lock actuator 1 for locking and unlocking the lock mechanisms Lh, Lm and Ls through the operation wires Wh, Wm and Ws is provided at a suitable location of the vehicle body. The lock actuator 1 forms part of an remote lock operation apparatus A of the present invention. As such, it performs a locking operation or an unlocking operation in accordance with an instruction signal from the electronic control circuit C. Control circuit C is a control apparatus provided at a suitable location of the vehicle body to lock or unlock the lock mechanisms Lh, Lm and Ls without a key.

The remote lock operation apparatus A mentioned above includes, in addition to the lock actuator 1, and the electronic control circuit C, an infrared transmitter T of a small size which can be carried by the driver, and an infrared receiver R disposed at the vehicle body front half portion of the scooter V so that it can receive an infrared signal emitted from the transmitter T. An operation switch 2 operable for inputting locking or unlocking is provided for the transmitter T, and a signal transmission section (not shown) capable of transmitting an infrared signal corresponding to a particular ID code in response to an operation input for the switch 2 is built in the transmitter T. It is to be noted that such a structure of the infrared transmitter, as just described, is conventionally known in the art.

The infrared receiver R is disposed at the center of the vehicle body front half portion in the vehicle widthwise direction (in the example shown in FIG. 3, on a rear face of an upper portion of the inner cover body Im described above which is not covered with the auxiliary cover Is) such that a reception face thereof is directed rearwardly. Further, the receiver is placed at a height at which reception of an infrared signal emitted from rearwardly is not disturbed by a vehicle accessory (such as, for example, the seat S, a baggage accommodating carrier and so forth) and the vehicle body rear portion (for example, the rear body cover Fr) on the rear side with respect to the receiver R.

The electronic control circuit C includes a signal discrimination section C1 including a CPU and a memory. The signal discrimination section C1 includes ID verification means for verifying and discriminating whether or not an infrared signal received by the infrared receiver R is legal, that is, whether or not the ID code of the received signal coincides with a particular ID code stored in advance, and instruction signal outputting means for outputting an operation instruction signal to the lock actuator 1 in response to discrimination of the verification means that the received signal is a legal infrared signal (that the ID code exhibits coincidence).

Further, a first energization circuit 3 for supplying power of a battery B to the electronic control circuit C and a relay circuit 4 having a main switch Sw and a main relay Re are connected to the electronic control circuit C. The relay circuit 4 opens or closes a second energization circuit 5, which interconnects the battery B and various electric systems (including an engine starting circuit) incorporated in the vehicle, to effect energization control of the electric systems.

Operation of the embodiment described above is described below.

It is assumed now that the scooter V is in a parking state and the lock actuator 1 is in a locking operative state so that all of the handle lock mechanism Lh, stand lock mechanism Lm and seat lock mechanism Ls are held in a locking state.

If, in this state, an infrared signal is emitted from the infrared transmitter T toward the infrared receiver R and is received by the infrared receiver R, then the signal discrimination section C1 of the electronic control circuit C verifies and discriminates whether or not the received signal is legal, that is, whether or not the ID code of the received signal coincides with the particular ID code stored in advance. If it is discriminated that the received signal is a legal infrared signal (if the ID code exhibits coincidence), then the signal discrimination section C1 outputs an operation instruction signal to the lock actuator 1 so that the actuator 1 is switched from the locking state into an unlocking state. Consequently, the handle lock mechanism Lh, stand lock mechanism Lm and seat lock mechanism Ls are unlocked at a time. Simultaneously, the electronic control circuit C controls the main relay Re to an energization permission state.

Thus, if the main switch Sw is switched from off to on, then the main relay Re can be switched on, and consequently, energization of all of the electric systems including the engine starting circuit is enabled. Accordingly, if a starter switch not shown is switched on in this state, then the engine starting circuit can be energized to start the engine. Then, upon completion of the starting of the engine, the scooter V is placed into a state wherein it can travel.

On the other hand, in order to stop the engine which is in an operating state, the main switch Sw is switched from on to off. Consequently, the energization of the electric systems of the engine is interrupted, and the engine stops. Then, if, in this state, an infrared signal is transmitted from the infrared transmitter T to the infrared receiver R again, then the signal discrimination section C1 of the electronic control circuit C verifies and discriminates whether or not the received signal is legal in such a manner as described above. If it is discriminated that the received signal is a legal infrared signal, then the signal discrimination section C1 outputs an operation instruction signal to the lock actuator 1 to switch the lock actuator 1 from the unlocking state to the locking state. Consequently, the handle lock mechanism Lh, stand lock mechanism Lm and seat lock mechanism Ls are locked at a time. Simultaneously, the electronic control circuit C controls the main relay Re to an energization inhibition state, and therefore, even if the main switch Sw is switched on, the main relay Re is not turned on.

Since the infrared receiver R of the remote lock operation apparatus A described above is used for only one vehicle, even if the capacity of the battery B carried on the vehicle is considerably small when compared with the capacity of a battery for a four-wheel automobile, the total standby current of the infrared receiver R can be reduced to such a level that minimal consumption of the battery occurs. Consequently, failure in starting of the engine caused by consumption of the battery can be prevented. Also, the durability of the battery B can be raised.

Further, the directivity required for the infrared receiver R for the scooter V generally is within the range of 45 degrees on the left and the right with respect to a longitudinal center line of the vehicle body as viewed rearwardly from the position of the left and right handle grip parts Hg of the vehicle in the forward and backward direction of the vehicle body as seen in FIG. 1. Accordingly, the mounted position of the infrared receiver R is preferably set to such a position at which the receiver can cover at least the directivity range described above without being influenced by the seat S or the vehicle body rear portion. However, the only one infrared receiver R is disposed at the center of the vehicle body front half portion in the vehicle widthwise direction (in the example shown, on the rear face of the upper portion of the inner cover body Im which is not covered with the auxiliary cover Is) such that the reception face thereof is directed rearwardly and is placed at the height at which reception of an infrared signal emitted from rearwardly is not disturbed by the seat S or the vehicle body rear portion Fr on the rear side with respect to the receiver R. Accordingly, due to the layout of the infrared receiver R as just described, the range of directivity of the infrared receiver required for a light vehicle of the type described can be covered readily without being influenced by the seat S, the vehicle body rear portion Fr or the like.

Figure 5:
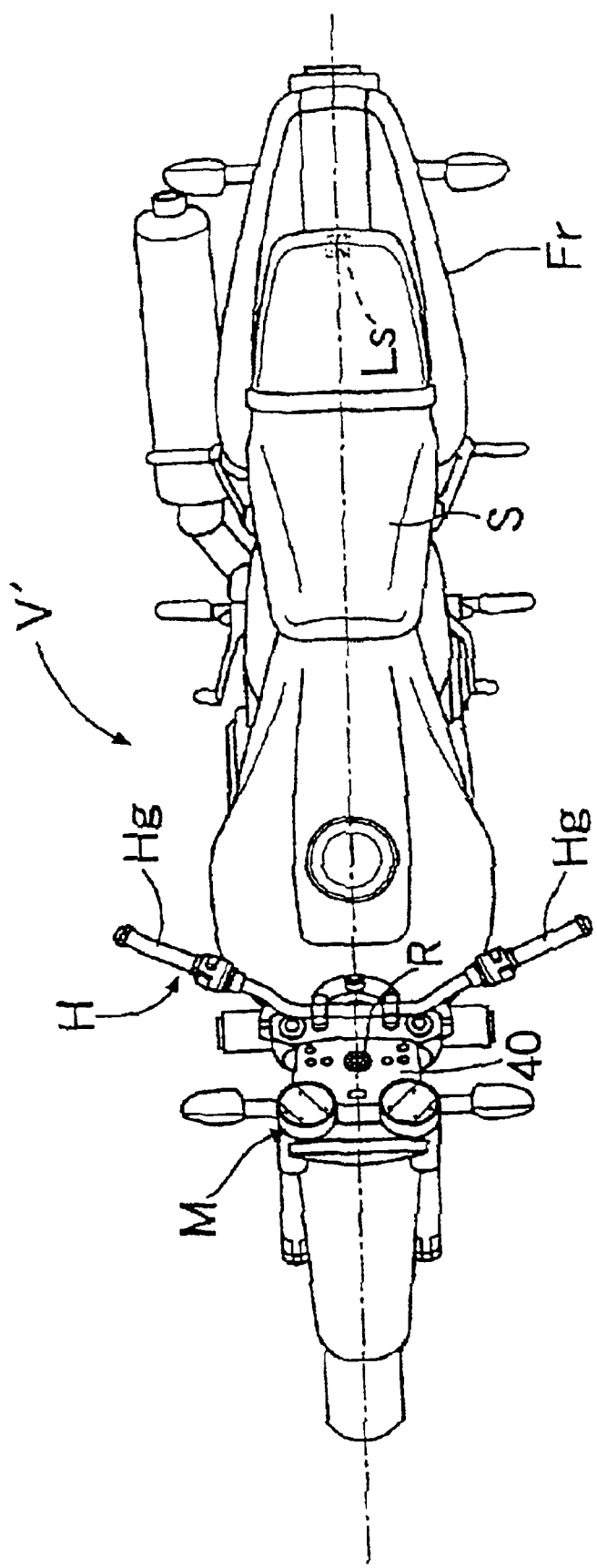
FIG. 5 is a perspective view of the motorcycle of the second embodiment.
Figure 6:
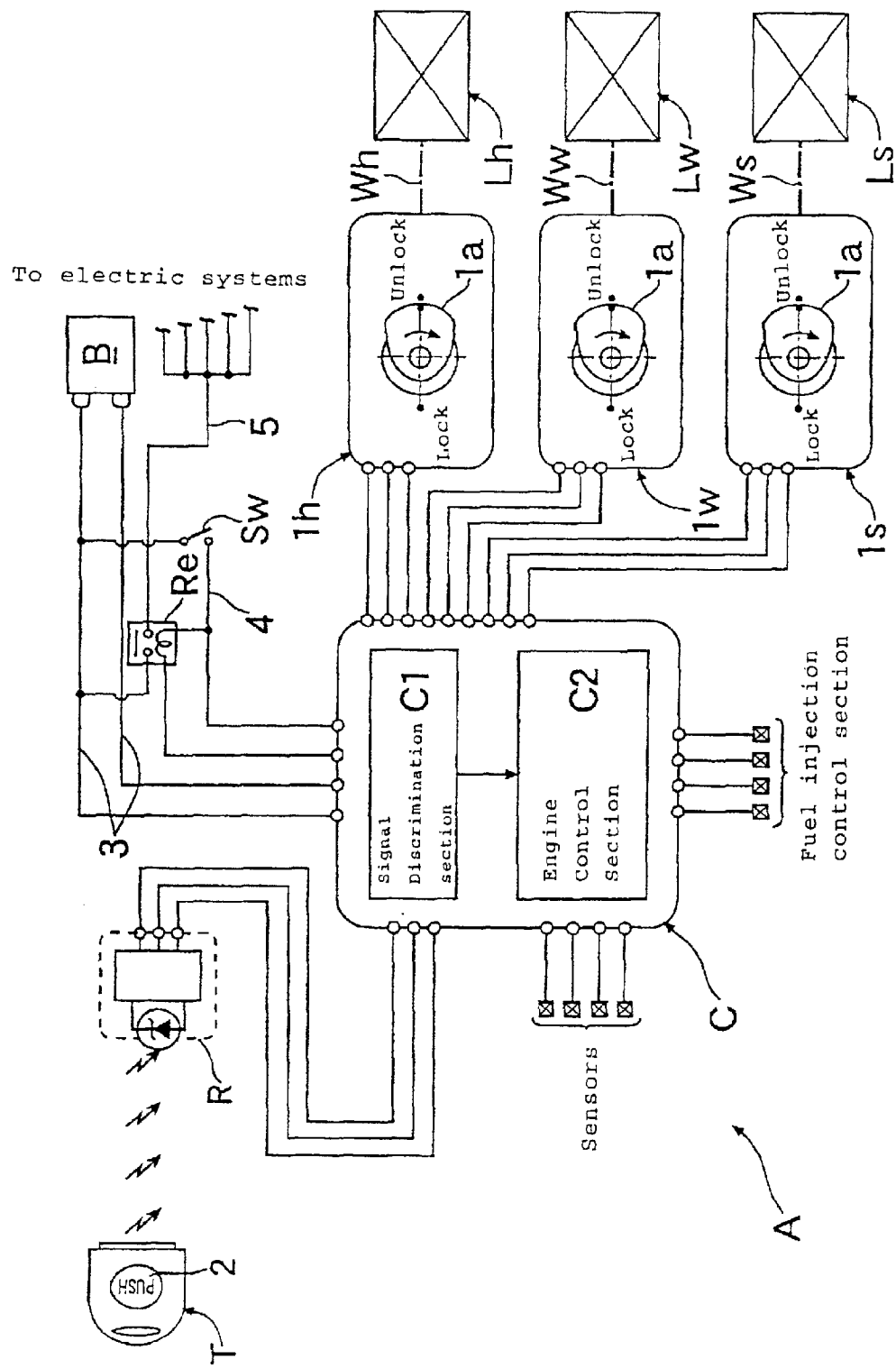
FIG. 6 is a schematic block diagram of a remote lock operation apparatus of the second embodiment.

Next, a second embodiment of the present invention will be described. The second embodiment is applied to a motorcycle, rather than the scooter of the first embodiment, and is shown in FIGS. 5 and 6. In the present embodiment, an infrared receiver R is disposed at the center in the vehicle widthwise direction of a mounting panel 40 for meters M as a vehicle body front half portion of the motorcycle V' such that a reception face thereof is directed rearwardly. The mounting panel 40 is fixed at a fixed location of a handle H or a steering shaft and extends upwardly in a forwardly upwardly inclined state on the front side of a central portion of the handle H. The infrared receiver R disposed on and fixed a rear face of the mounting panel 40 which is inclined rearwardly upwards is positioned at a height at which reception of an infrared signal emitted from rearwardly is not disturbed by a vehicle accessory (for example, a seat S, a baggage accommodating carrier or the like) on the rear side with respect to the receiver R.

Further, in the second embodiment, a wheel lock mechanism Lw for locking rotation of a wheel is provided in place of the stand lock mechanism Lm of the preceding embodiment. Besides, the wheel lock mechanism Lw, handle lock mechanism Lh and seat lock mechanism Ls are locked and unlocked by means of lock actuators 1w, 1h and 1s for exclusive use, respectively. Accordingly, the lock actuators 1w, 1h and 1s can be disposed in the proximity of the corresponding lock mechanisms Lw, Lh and Ls and can drive the mechanisms effectively, respectively.

Further, as can be seen from FIG. 6, the electronic control circuit C as a control apparatus for the remote lock operation apparatus A includes, in addition to the signal discrimination section C1, an engine control section C2 for electronically controlling the engine in response to various operation states and operation conditions. The engine control section C2 outputs, in the example shown, a control signal to a fuel injection control section for the engine in order to control the fuel injection amount of the engine in response to detection signals of a water temperature sensor and other various engine controlling sensors.

In the second embodiment, the other configuration of the remote lock operation apparatus A is basically similar to that of the first embodiment. Also, the second embodiment has operations and effects similar to those of the first embodiment.

Next, a third embodiment of the present invention will be described. Like the first embodiment, the third embodiment is applied to a scooter. The third embodiment is shown in FIGS. 1, 2, 4, and 7.

Figure 7:
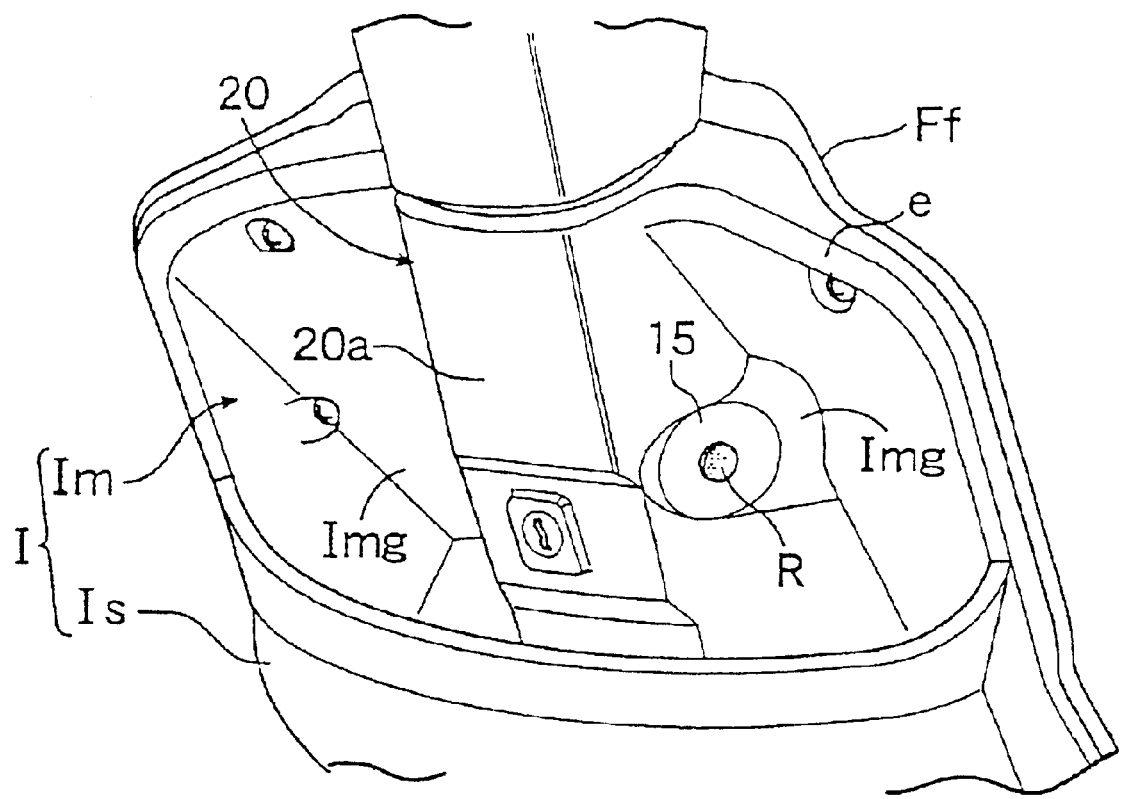
FIG. 7 shows a third embodiment and is a perspective view (an enlarged view as viewed in the direction indicated by an arrow mark 3 in FIG. 2) of an inner cover as viewed from obliquely rearwardly.

As shown in FIG. 7, the inner cover I is formed from an inner cover body Im and an auxiliary cover Is which covers a lower portion of a rear face of the inner cover body Im, and an upper portion of the rear face of the cover body Im is open rearwardly. A central portion of the inner cover body Im is swollen to the rear side such that it surrounds a rear half portion of the steering shaft 11, and a rear face of the central swollen portion 20 is formed as an inclined face 20a inclined rearwardly downwards such that it extends substantially along the steering shaft 11.

On the rear face of the inner cover body Im, a pair of concave faces Img hollow to the front side of the vehicle body from a body upper end portion e of the inner cover body Im are formed on the opposite left and right sides of the central swollen portion 20, and a flat mounting face 15 inclined rearwardly upwards is formed at a lower portion of one of the left and right concave faces Img. As shown in FIG. 7, an infrared receiver R of the third embodiment is disposed at and fixed to the mounting face 15.

Although the scooter V of the third embodiment has no cabin, since the infrared receiver R of the remote lock operation apparatus A is provided on the rear face of the inner cover body Im (in the example shown, the concave face Img hollow to the front side of the vehicle body), the infrared receiver R is less likely to be damaged through a collision or contact with some other element, it can be protected effectively from falling down and so forth and the reliability in traveling is raised. Also, since the rear face of the inner cover body Im is positioned just below the handle cover Hc, the infrared receiver R disposed on the rear face of the cover body Im is less likely to be exposed to the direct rays of the sun in the daytime in cooperation with the reason that the face on which the infrared receiver R is disposed is the concave face Img described above. Consequently, deterioration of the SN ratio of the receiver R is suppressed effectively, and the communication reliability between the transmission and receivers is raised.

Further, the directivity required for the infrared receiver R for the scooter V generally is within the range of 45 degrees on the left and the right with respect to a longitudinal center line of the vehicle body as viewed rearwardly from the position of the left and right handle grip parts Hg of the vehicle in the forward and backward direction of the vehicle body as seen in FIG. 1. Accordingly, the mounted position of the infrared receiver R is preferably set to such a position at which the receiver R can cover at least the directivity range described above without being influenced by the seat S or the vehicle body rear portion Fr. However, since the infrared receiver R is disposed at an upper portion of the rear face of the inner cover body Im, and is provided at a comparatively high position spaced forwardly away from the seat S and the vehicle body rear portion Fr as in the present embodiment, the range of directivity of the infrared receiver R required for the scooter V can be covered readily. In other words, the range of directivity adversely influenced by the seat S or the vehicle body rear portion Fr.

Figure 8:
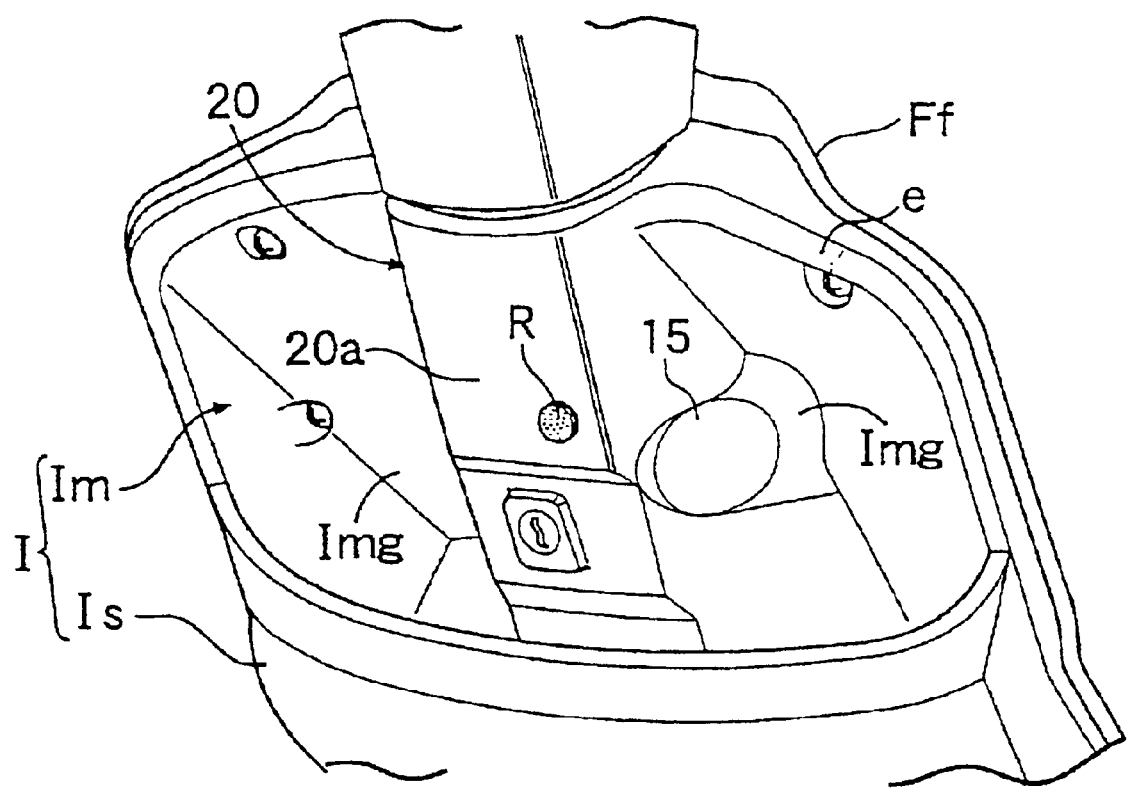
FIG. 8 shows a fourth embodiment and is a perspective view (an enlarged view as viewed in the direction indicated by an arrow mark 3 in FIG. 2) of an inner cover as viewed from obliquely rearwardly.

A fourth embodiment of the present invention is shown in FIGS. 1, 2, 4, and 8. As can be seen in FIG. 8, an infrared receiver R of the fourth embodiment is disposed on and fixed to an inclined face formed on a rear face of an inner cover body Im and inclined rearwardly downwards (in the example shown, an inclined face 20a rearwardly inclined on a rear face of a central swollen portion 20 of the inner cover body Im) such that a reception face thereof is directed rearwardly. Thus, operation and effects of the fourth embodiment are basically similar to those of the first and third embodiments described above.

Figure 9:
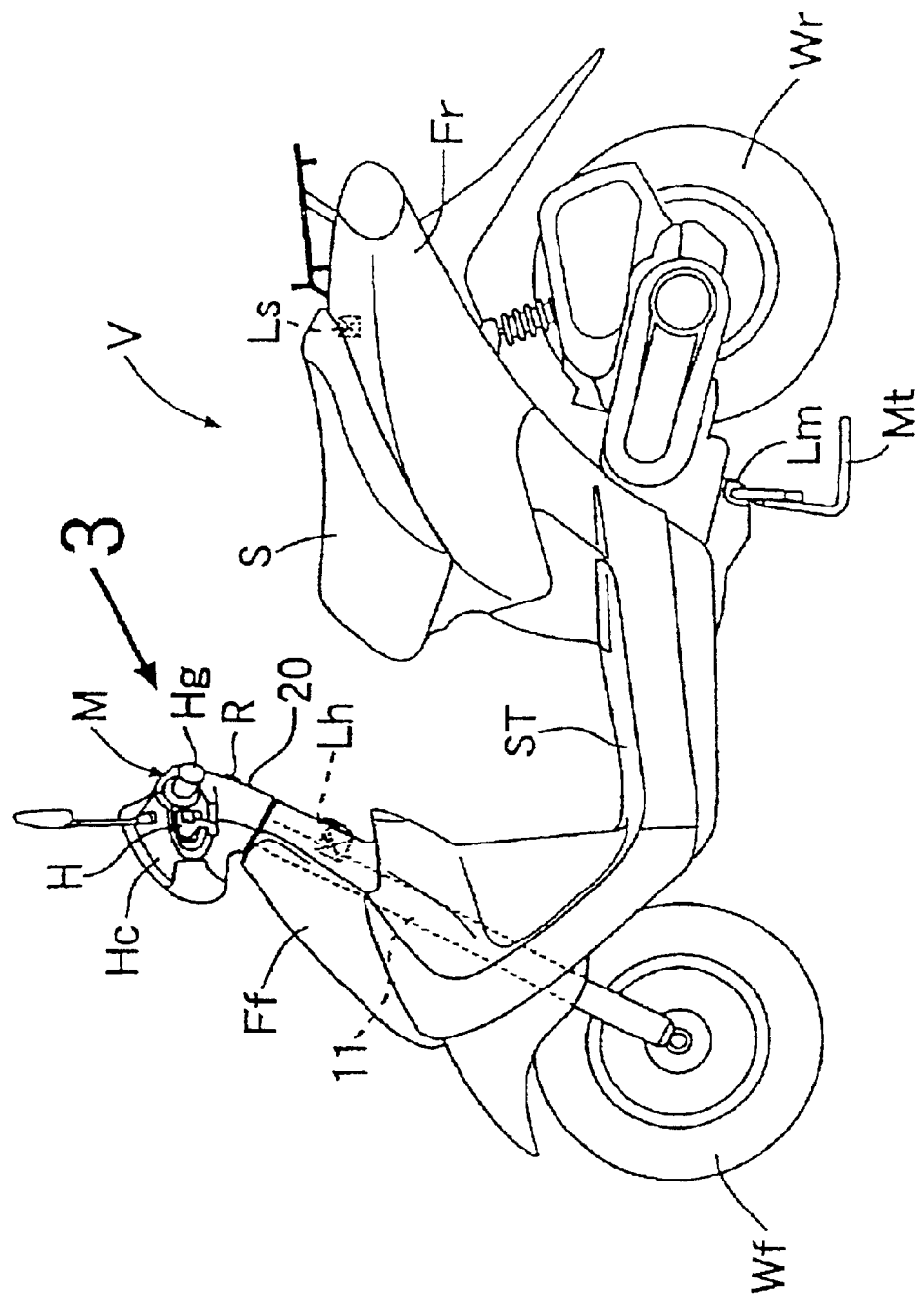
FIG. 9 shows a fifth embodiment and is a side elevational view of the scooter.

A fifth embodiment of the present invention is shown in FIGS. 1, 4, 9, and 10. Referring to FIGS. 1 and 9, the scooter V of the fifth embodiment includes a bar handle H operable for steering the front wheel Wf through a steering shaft 11. The steering shaft 11 is supported for rotation on a head pipe of a vehicle body front frame not shown and extends in an upward and downward, rearwardly inclined posture on the inner side, that is, on the rear side, of a front body cover Ff made of metal or synthetic resin as the vehicle body front portion. A lower portion of the steering shaft 11 is formed in a bifurcated fork for supporting the front wheel Wf for rotation. An upper end of the steering shaft 11 is coupled to a central portion of the bar handle H such that the bar handle H and the steering shaft 11 are turned integrally in accordance with a steering operation.

Figure 10:
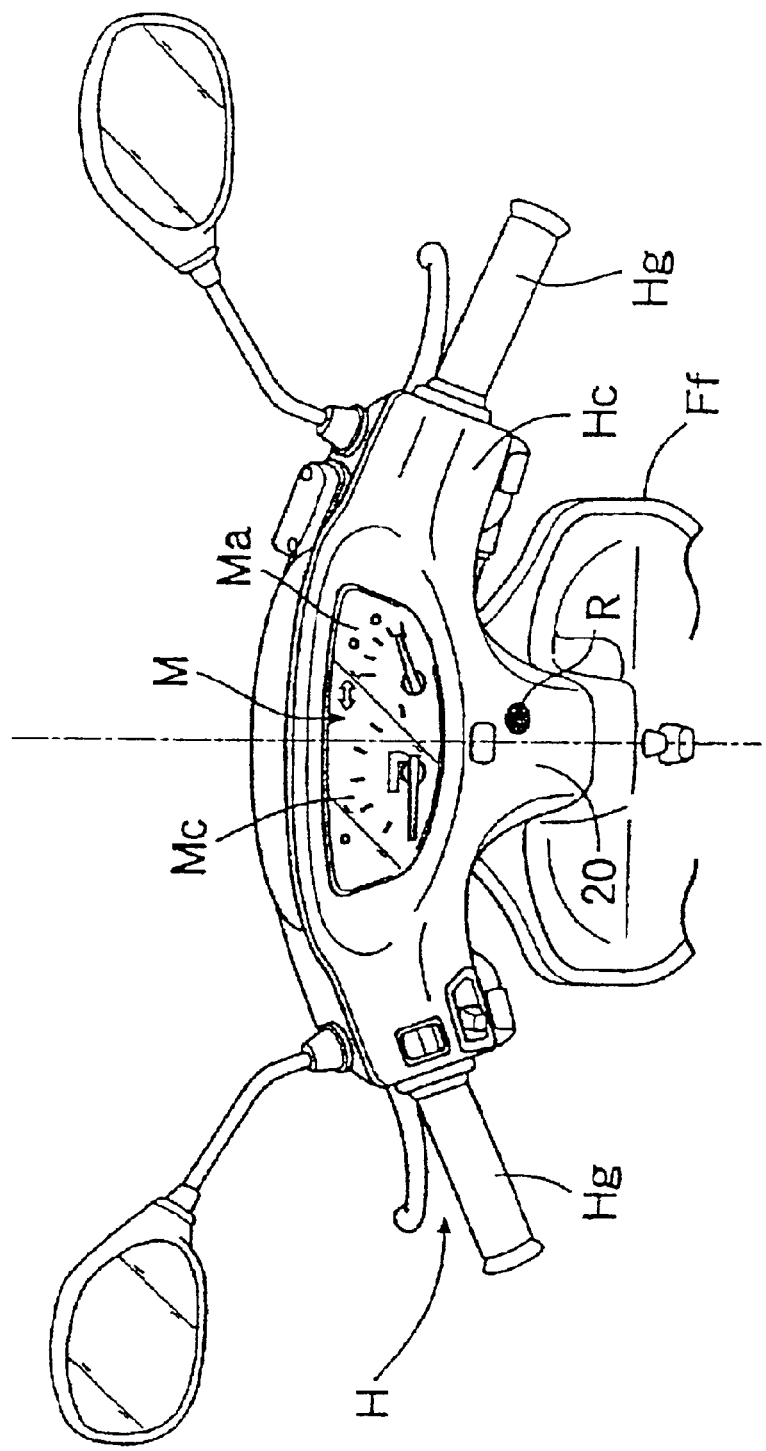
FIG. 10 shows the fifth embodiment and is a perspective view (enlarged view as viewed in the direction indicated by an arrow mark 3 in FIG. 9) of a handle and elements around the handle of the scooter as viewed from obliquely rearwardly.

As shown in FIGS. 9 and 10, the central portion of the bar handle H and the upper end portion of the steering shaft 11 are covered in good appearance with a T-shaped handle cover Hc made of synthetic resin or metal which is turned integrally with them. Left and right handle grips Hg at the opposite ends of the bar handle H extend outwardly from the opposite left and right end portions of the handle cover Hc. A rear portion outer face 20 of the handle cover Hc is inclined rearwardly downwards, and an infrared receiver R which is hereinafter described is disposed on the rear portion outer face 20 of the handle cover Hc.

The rear side of a lower side portion of the steering shaft 11 described above than the handle cover Hc is covered with an inner cover I made of metal or synthetic resin which is erected uprightly and integrally from a front end portion of the step ST. The inner cover I is removably coupled to the rear face side of the front body cover Ff, and a vehicle body space through which the steering shaft 11 extends is formed between the rear face side of the cover Ff and the inner cover I.

Although the scooter V of the fifth embodiment has no cabin, since the infrared receiver R of the remote lock operation apparatus A is provided on the rear portion outer face 20 of the handle cover Hc, the infrared receiver R is less likely to be damaged through a collision or contact with other elements. Also, the reciever can be protected effectively from falling down and so forth and the reliability in traveling is raised. Further, since the infrared receiver R is disposed on the rearwardly inclined rear portion outer face 20 of the handle cover Hc, it is less likely to be exposed to the direct rays of the sun in the daytime. Consequently, deterioration of the SN ratio of the receiver R is suppressed effectively, and the communication reliability between the transmitter and receiver is raised.

The mounted position of the infrared receiver R of the fifth embodiment is preferably set to such a position at which the receiver can cover the directivity range described above without being influenced by the seat S or the vehicle body rear portion. However, since the infrared receiver R is disposed on the rear portion outer face 20 of the handle cover Hc positioned on the front side and the upper side with respect to the seat S or the vehicle body rear portion Fr as in the present embodiment, obstacles to reception on the rear side with respect to the receiver R are eliminated to the utmost and the reception performance of the receiver R can be raised thereby. Accordingly, the range of directivity of the infrared receiver required for the scooter V can be covered readily without being influenced by the seat S or the vehicle body rear portion Fr.

While the embodiments of the present invention are described in detail, the present invention is not limited to the embodiments described above and various small design changes are possible. For example, while, in the embodiments described above, a plurality of lock mechanisms Lw, Lh, Lm, and Ls are locked and unlocked at a time by the single common lock actuator 1, according to the present invention, the lock mechanisms Lw, Lh, Lm, and Ls may alternatively be locked and unlocked by respective lock actuators for exclusive use. Also, while, in the embodiments described above, a plurality of lock mechanisms Ls, Lh, Lm and Lw provided at a plurality of locations of a vehicle can be remotely operated collectively, according to the present invention, only some of the lock mechanisms Ls, Lh, Lm and Lw may be operated remotely. Further, the locking mechanism which is an object of remote operation of the present invention is not limited to those of the embodiments.

Further, while, in the embodiments, the infrared receiver R is disposed at the center in the vehicle widthwise direction of the inner cover I of the scooter V or the meter mounting panel 40 of the motorcycle V', according to the present invention, the subject to which the infrared receiver is to be incorporated is not limited to those of the embodiments.

As described above, according to the present invention, in a light vehicle having no cabin, an infrared receiver of a remote lock operation apparatus is disposed at the center of a vehicle body front half portion in a vehicle widthwise direction with a reception face thereof directed rearwardly and is placed at a height at which reception of an infrared signal emitted from rearwardly is not disturbed by a vehicle accessory or the vehicle body on the rear side with respect to the receiver. Therefore, due to the layout of the infrared receiver as just described, the range of directivity of the infrared receiver required for a light vehicle of the type described can be covered readily without being influenced by the seat or the vehicle body rear portion. Accordingly, the necessary directivity can be assured even with the only one infrared receiver, and the number of infrared receivers to be used can be reduced to the utmost. Therefore, the standby current of the infrared receiver can be reduced to a level with which consumption of a battery does not occur even if the capacity of the battery is small, and consequently, failure in starting of an engine by consumption of the battery can be prevented and also the durability of the battery is raised.

As described above, according to the present invention, even if a light vehicle does not have a strong cabin surrounded by a roof and so forth, since an infrared receiver of a remote lock operation apparatus is provided on the rear face of an inner cover where the infrared receiver is less likely to be damaged through a collision or contact with some other element, it can be protected effectively from falling down and so forth and the reliability in traveling is raised. Besides, since the inner cover is positioned just below a bar handle, the infrared receiver disposed on the inner cover is less likely to be exposed to the direct rays of the sun in the daytime. Consequently, deterioration of the SN ratio of the receiver is suppressed effectively, and the communication reliability between the transmission and receivers is raised. Further, since an upper portion of the inner cover is provided at a comparatively high position spaced forwardly away from a seat and a vehicle body rear portion, where the infrared receiver is disposed at the upper portion of the inner cover, the range of directivity of the infrared receiver required for the light vehicle can be covered readily without being influenced by the seat or the vehicle body rear portion to the utmost.

And specially, according to the present invention, a concave face hollow to the front side of the vehicle body or an inclined face inclined rearwardly downwards is formed on the rear face of the inner cover, and the infrared receiver is provided on the concave face or the inclined face. Consequently, the infrared receiver is further less likely to be damaged through a collision or contact with some other element and can be protected more effectively from falling down and so forth. Besides, the infrared receiver is further less likely to be exposed to the direct rays of the sun in the daytime and the communication reliability is further raised.

As described above, according to the present invention, even if the light vehicle does not have a strong cabin surrounded by a roof and so forth, since the infrared receiver of the remote lock operation apparatus is provided on the rear portion outer face of the handle cover where the infrared receiver is less likely to be damaged through a collision or contact with some other element, it can be protected effectively from falling down and so forth and the reliability in traveling can be raised. Besides, since the infrared receiver is less likely to be exposed to the direct rays of the sun in the daytime, deterioration of the SN ratio of the receiver is suppressed effectively, and the communication reliability between the transmitter and receiver is raised. Further, since the handle cover is usually provided at a higher position than the seat or the vehicle body rear portion, through the fact that the infrared receiver is disposed on the rear portion outer face of such a handle cover as just described, the range of directivity of the infrared receiver required for the light vehicle can be covered readily without being influenced by the seat or the vehicle body rear portion to the utmost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote lock operation apparatus for a light vehicle having no cabin, comprising:
    a portable infrared transmitter;
    an infrared receiver capable of receiving an infrared signal emitted from said infrared transmitter;
    a lock actuator capable of locking and unlocking a lock mechanism incorporated in a vehicle body;
    a control apparatus for controlling operation of said lock actuator based on the infrared signal received by said infrared receiver; and
    a mounting panel fixed at fixed location on a handle bar or a steering shaft and extending upwardly in a forwardly upwardly inclined state on a front side of a central portion of the handle bar,
    wherein said infrared receiver is disposed in a position higher than the seat on said mounting panel with a reception face thereof directed rearwardly, and is placed at a height at which reception of an infrared signal emitted from rearwardly is not disturbed by a vehicle accessory or a vehicle body rear portion on the rear side with respect to said receiver.

2. The remote lock operation apparatus for a light vehicle of claim 1, wherein said locking mechanism further comprises a handle locking mechanism, a seat locking mechanism, and a stand locking mechanism.

3. The remote lock operation apparatus for a light vehicle of claim 1, wherein said locking mechanism further comprises a handle locking mechanism, a seat locking mechanism, and a wheel locking mechanism.

4. A remote lock operation apparatus for a light vehicle having a bar handle connected to an upper end portion of a steering shaft for steering a front wheel but not having a cabin, comprising:
    a portable infrared transmitter;
    an infrared receiver capable of receiving an infrared signal emitted from said infrared transmitter;
    a lock actuator capable of locking and unlocking a lock mechanism incorporated in a vehicle body; and
    a control apparatus for controlling operation of said lock actuator based on the infrared signal received by said infrared receiver; and
    an inner cover fixed to a vehicle body front portion for covering the rear side of said steering shaft in a position which is below a handle cover,
    said infrared receiver being disposed in a position higher than the seat on a rear face of said inner cover so as to be protected from the sun by said handle cover.

5. The remote lock operation apparatus for a light vehicle of claim 4, wherein the inner cover is formed with a pair of concave faces hollow to the front side of said vehicle body and a central swollen portion, the concave faces and the central swollen portion being inclined rearwardly downwards formed on the rear face of said inner cover, wherein said infrared receiver is provided on one of said concave faces or said central swollen portion.

6. The remote lock operation apparatus for a light vehicle of claim 4, wherein said locking mechanism further comprises a handle locking mechanism, a seat locking mechanism, and a stand locking mechanism.

7. A remote lock operation apparatus for a light vehicle without a cabin and having a bar handle for steering a front wheel and a handle cover for covering a central portion of said bar handle are disposed on the front side and on the upper side with respect to a seat, comprising:

a portable infrared transmitter;

an infrared receiver capable of receiving an infrared signal emitted from said infrared transmitter;

a lock actuator capable of locking and unlocking a lock mechanism incorporated in a vehicle body; and a control apparatus for controlling operation of said lock actuator based on the infrared signal received by said infrared receiver, wherein said infrared receiver is disposed in a position higher than the seat on a lower rear portion outer face of said handle cover which is inclined rearwardly downwards so as to avoid a likelihood of exposure to direct sun rays, thereby effectively suppressing a signal to noise ratio of the receiver.

8. The remote lock operation apparatus for a light vehicle of claim 7, wherein said locking mechanism further comprises a handle locking mechanism, a seat locking mechanism, and a stand locking mechanism.

9. The remote lock operation apparatus for a light vehicle of claim 5, further comprising a flat mounting face formed at a lower portion of one of the pair of concave faces, and the receiver is mounted on the flat mounting face.

* * * * *